Aug. 9, 1960 V. IGNATJEV 2,948,271
AUTOMATIC MOTOR SPEED CONTROL APPARATUS
Filed Nov. 8, 1957 3 Sheets-Sheet 2
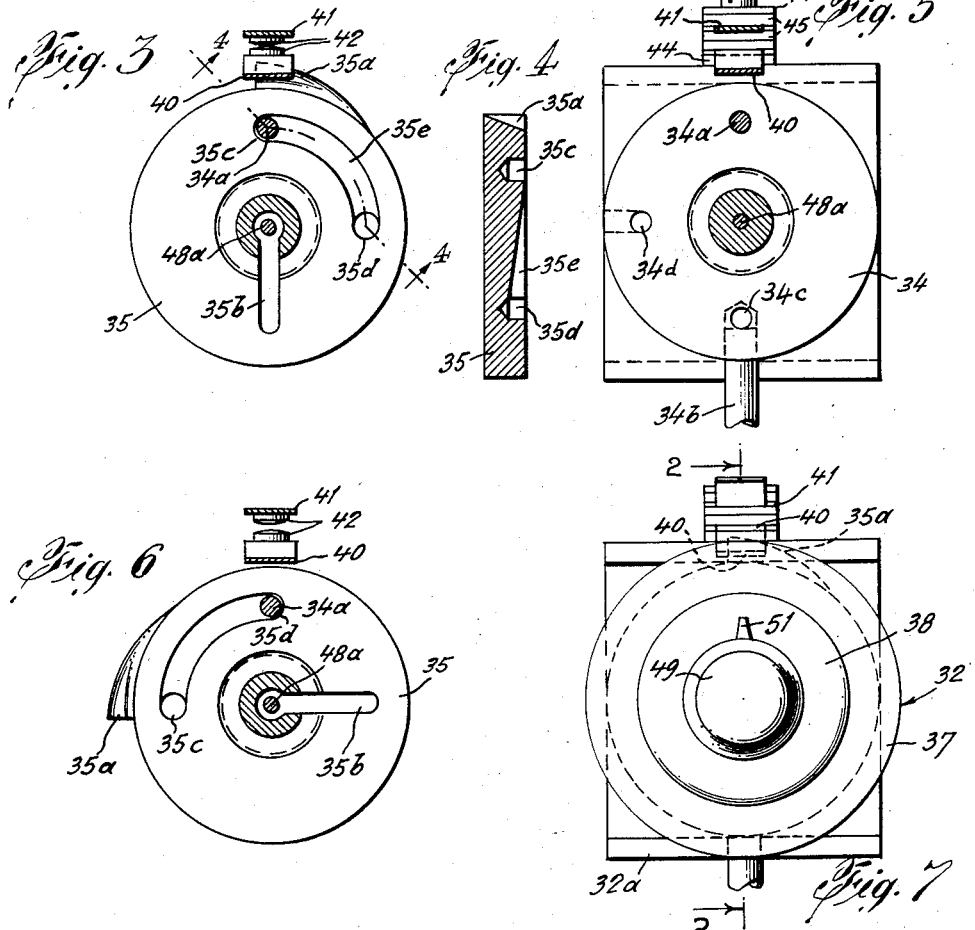
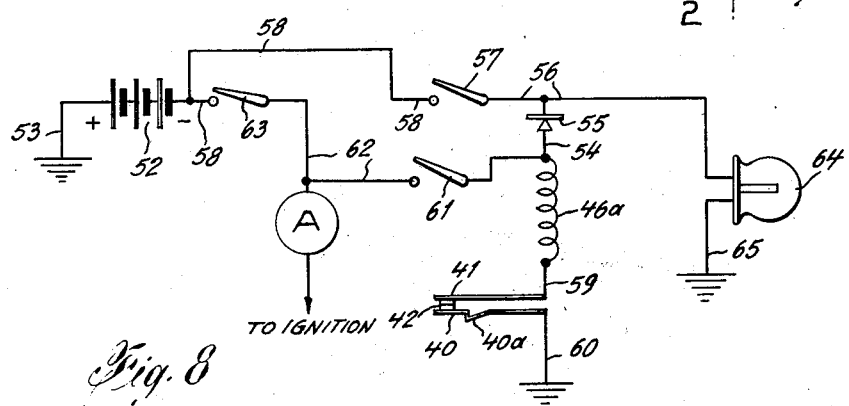
INVENTOR
Vladimir Ignatjev.

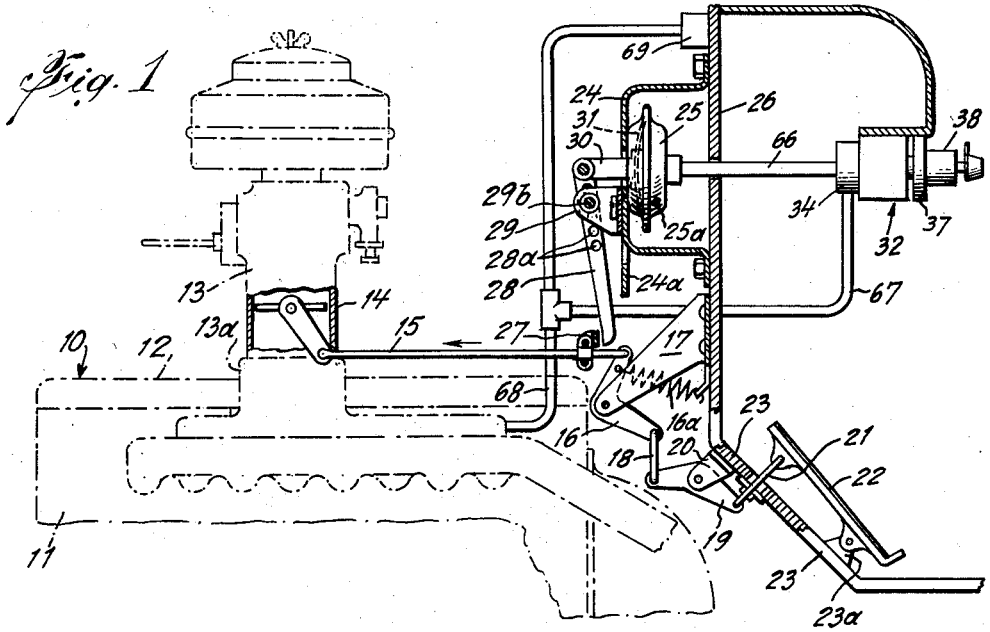
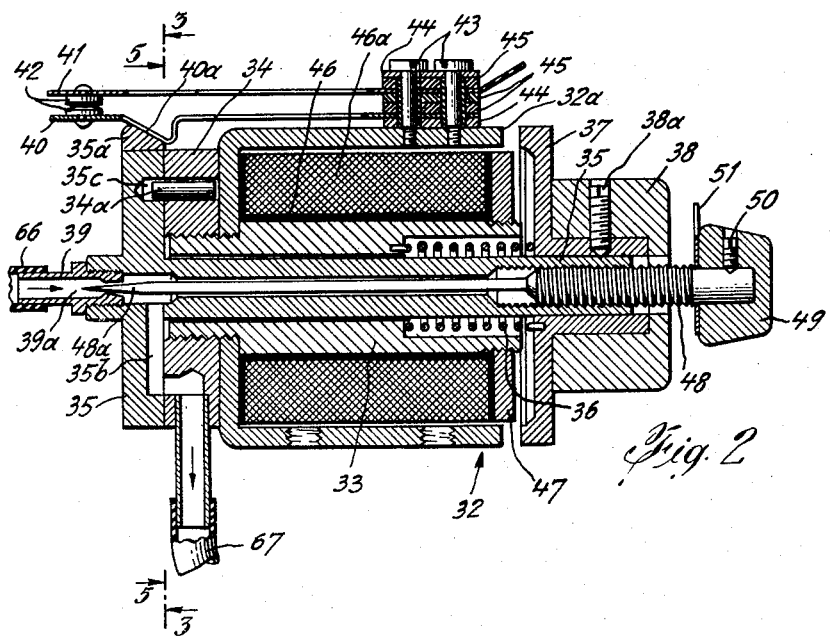

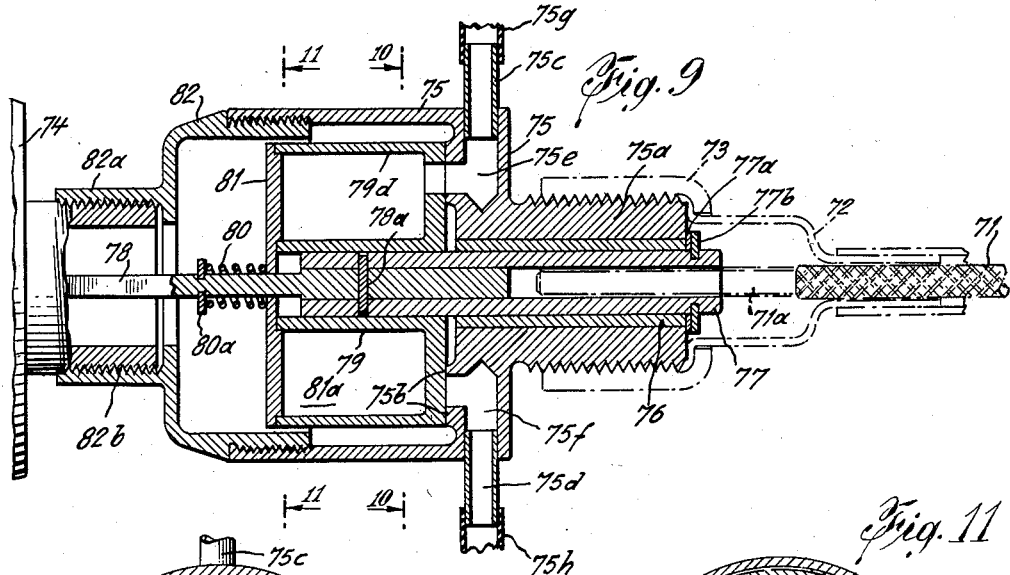
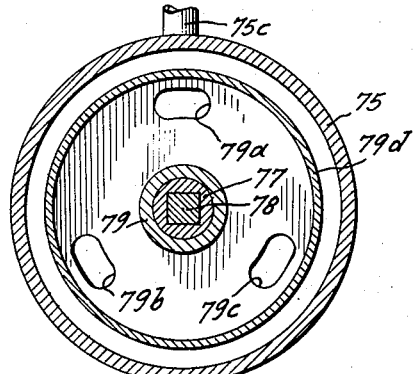
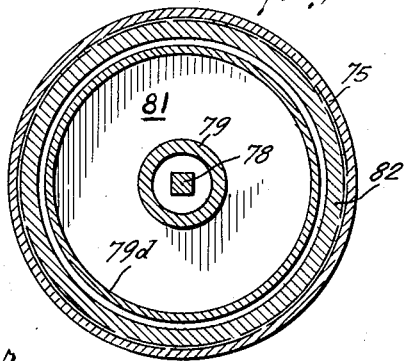
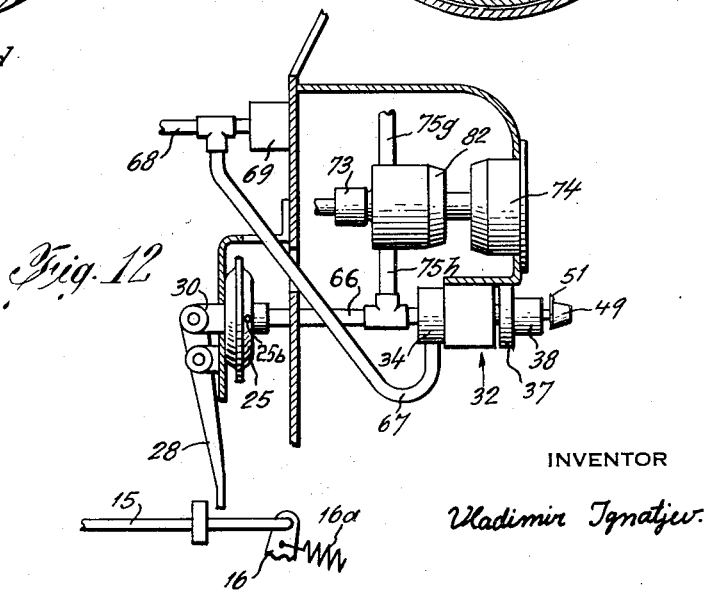
INVENTOR
Vladimir Ignatjev

United States Patent Office 2,948,271
Patented Aug. 9, 1960

2,948,271

AUTOMATIC MOTOR SPEED CONTROL APPARATUS

Vladimir Ignatjev, 45 Cove Ave., East Norwalk, Conn.

Filed Nov. 8, 1957, Ser. No. 695,253

15 Claims. (Cl. 123—102)

This invention relates to automatic speed control apparatus and is shown herein in an embodiment especially adapted for internal combustion engines as now employed in automobiles or the like.

Hand throttles commonly used on early models of automobiles and trucks were generally abandoned many years ago, since with increased speeds such a device was found hazardous in that releasing of the hand throttle was a separate operation which often resulted in accidents. Also, it was found that during long or sustained periods of driving, changing road conditions made it necessary to readjust the hand throttle which, in addition to the inconvenience, also required specific attention causing an operator to be momentarily distracted, thereby resulting in failure to observe traffic with disastrous results.

The present invention is particularly desirable for long distance driving since it functions to relieve the operator of a motor vehicle from the necessity of manually feeding gas for long periods of time. During normal operation of a vehicle, the conventional foot throttle arrangement requires continuous depression of a foot pedal by the operator which, during long periods of constant driving, is tiresome and often results in cramped foot and leg muscles. Furthermore, while driving on expressways at high speeds one often encounters a somewhat paralyzing fatigue known as highway hypnosis which is dangerous and leads to fatal accidents in many cases. It is believed the latter condition results from maintaining continuously uniform speed without being completely free of mind to observe scenery and landmarks due to the subconscious effort of maintaining constant pressure on the gas feeding pedal.

It is also well known that, after traveling on highways for long periods of time at high speeds, one finds it difficult to judge speed when entering a low-speed zone, the results of which may also be reflected in excessive speeds in such zones without realization by the operator.

The automatic throttle control provided by the present invention overcomes the aforementioned disadvantages in that it permits safe and relaxed operation of a vehicle without constant use of the foot-operated gas feeding pedal during expressway as well as city driving.

The invention provides automatic throttle operation thereby keeping the vehicle speed constant within certain limits, even though road conditions change. Normally the vehicle slows down on an up-grade, unless additional gas is fed manually. Likewise the vehicle's speed will increase on down-grades, unless less gas is fed through the carburetor, allowing the engine to slow down and decrease the vehicle's speed.

The invention further makes provision for certain safety features which permit the operator to stop the vehicle quickly, even though the automatic throttle apparatus is engaged, since applying the brakes automatically releases the automatic throttle control.

The invention also provides means for allowing the operator to increase the speed of the vehicle while the automatic throttle control apparatus is engaged and set for a predetermined speed, thus permitting passing on open highways without releasing the automatic device.

The invention further provides means to release the automatic throttle apparatus upon operation of the gas pedal the full amount, as for instance when passing on a hill, using the well-known "kick-down" power shift method, thus restoring the throttle linkage to normal to permit subsequent up-shifting with decreased engine speed, required by certain makes of cars.

It is, therefore, an object of the invention to permit automatic control over a variable speed motor.

An additional object of the invention is to enable automatic control of a variable speed motor at a predetermined r.p.m. regardless of varying load factors placed on the motor.

A further object of the invention is to enable automatic motor speed control at a predetermined r.p.m. through means which automatically becomes disabled when operator intervention under conditions wherein the predetermined r.p.m. is no longer desired.

Other objects of the present invention are to provide an engine throttle or speed control which is simple and rugged in construction; safe and reliable in its operation; economical to manufacture; and which can be easily installed upon various types and sizes of engines without modifying the engines or altering the existing parts of such engines in any substantial way.

Still other objects of the invention will be pointed out in the following description and claims, and illustrated in the accompanying drawings, which disclose by way of example only the principles of the invention and preferred structure which has been contemplated, of applying those principles.

In the drawings:

Fig. 1 is a fragmentary side elevational view of an internal combustion engine and throttle linkage showing features of the invention connected therewith.

Fig. 2 is a vertical section of a combination manual setting and power release selector with needle valve for adjusting speed, taken on a plane indicated by line 2—2 of Fig. 7.

Fig. 3 is a sectional elevation of the "on-off" control valve as seen thru line 3—3 of Fig. 2 and shown in the "on" position.

Fig. 4 is a sectional view of that portion of the control valve shown in Fig. 3 as seen thru line 4—4 of Fig. 3.

Fig. 5 is a sectional view of the control valve seen from line 5—5 of Fig. 2.

Fig. 6 is a view similar to Fig. 3 but shown in the "off" position.

Fig. 7 is a front end elevation of the combination selector shown in Fig. 2.

Fig. 8 is a wiring diagram of the electrical circuit for the throttle control mechanism.

Fig. 9 is a vertical section of speed control mechanism of the invention.

Fig. 10 is a sectional view of the speed control rotor as seen thru line 10—10 of Fig. 9.

Fig. 11 is a sectional view as seen thru line 11—11 of Fig. 9.

Fig. 12 is a schematic drawing showing the interconnection of elements of the invention as they are tied into the vacuum and speedometer system respectively.

Referring to the drawings in detail, particularly to Fig. 1, reference numeral 10 generally indicates a conventional internal combustion engine, 11 the engine block, 12 the engine head, and 13 the carburetor, the latter being secured to the manifold intake 13a in the convenitonal well-known manner. The usual butterfly throttle valve 14 is rotated from the closed position shown in varying amounts thru the usual throttle linkage consisting of link or rod 15, bell crank 16 pivoted on supporting bracket 17, link 18, bell crank 19 supported on bracket 20 fastened to floor board 23, and link 21 connected to foot pedal 22, the latter being also pivotally secured to floor board 23 by bracket 23a. Thus, when pedal 22 is depressed, a mixture of air and gasoline enters manifold intake 13a, causing engine 10 to propel the vehicle at the desired speed. A reduced amount of fuel enters manifold intake 13a when foot pedal 22 is released, this being accomplished thru spring 16a which urges the throttle linkage toward the position where butterfly valve 14 is closed, causing engine 10 to idle in the usual manner.

As illustrated in Fig. 1, one feature of the automatic throttle control apparatus comprises a vacuum actuator 25 of the type well known in the automotive industry, particularly used to advance the timing of the engine's ignition system. The actuator is supported by a bracket 24 mounted upon the fire wall 26 inside the motor compartment in close proximity to the throttle linkage for example, rod 15, which is provided with an adjustable arm 27. A minutely vented plug 25a in actuator 25 permits a small amount of air flow when vacuum is applied. Co-operating with arm 27 is an operating lever 28, which is pivotally supported on an adjustable support 29, also carried by actuator bracket 24 on an extension 24a thereof. Support 24 is fastened onto bracket extension 24a by any suitable means such as a bolt 29a, permitting pivot support 29 to be adjusted in a suitable slot on extension 24a for the purpose of providing proper leverage ratio for lever 28, since the throttle linkage motion may vary slightly between different makes of cars. This can easily be accomplished by assembling the parts utilizing a suitable hole 28a, so that arm of lever 28 over pivot bolt 29b of bracket 29 produces sufficient motion to move arm 27 and throttle rod 15 the full amount, thus opening butterfly valve 14 completely when diaphragm 31 of vacuum actuator 25 and link 30 attached thereto move the linkage in the direction shown by arrow in Fig. 1.

Referring to Figs. 2, 3, 4, 5, 6, and 7, the combination manual set and power release selector hereafter also called "control selector" 32, comprises a U-shaped frame 32a which supports a magnet core 33, the latter being threaded thru the center of frame 32 and securely locked by a stationary control valve member 34. Magnet core 33 also supports a movable control valve member 35 the head portion of which is longitudinally tensioned against stationary valve member 34 by a torsion and compression spring 36 recessed into and positively engaging magnet core 33 at one end thereof and armature 37 at its other end. Magnet core 33 also supports coil bobbin 46 onto which coil wire 46a is wound in a well known manner. Coil 46 is securely held onto magnet core 33 by a non-magnetic nut 47 clearly illustrated in Fig. 2. The movable control valve member 35 extends thru core 33 sufficiently beyond nut 47 to support magnet armature 37 and master control knob 38, both of which are securely held in place by set screw 38a. Thru the center of control valve member 35 is disposed needle valve stem 48 which is threaded into valve member 35 at the front end thereof permitting adjustment of needle valve stem 48 by turning knob 49, the latter being securely fastened to valve shaft 48 by set screw 50. A position indicator 51 is integrally fastened to knob 49, the purpose of which will be described later.

Referring to Figs 3, 4, 5 and 6 in detail, the peripheral surface of the head portion of valve 35 is provided with a cam lobe 35a, the latter being tapered in two directions as illustrated in Figs. 2, 3, 4, and 6. Lobe 35a co-operates with a switch leaf 40 thru cam surface 40a of switch leaf in such a way that both radial as well as horizontal linear motion actuates switch leaf 40. As illustrated in Figs. 2 and 7, switch leafs 40 and 41 with respective contacts 42 supported by control selector frame 32, and sandwiched between flat insulators 45 are securely fastened between pressure plates 44 to frame 32 by screws 43. The lower pressure plate 44 serves both as a spacer for leaf 40 and as a conductor to ground as will be evident during the explanation of the electrical circuit shown in Fig. 8.

Again referring to Figs. 2 and 5, the stationary valve member or disc 34 supports at its upper end a limit and camming pin 34a which co-operates with limit holes 35c, 35d and groove 35e, the latter being radially and angularly recessed into the inner surface of valve head member 35 as illustrated in Figs. 3 and 4. Also recessed into the same inner surface of valve member 35 is another groove 35b which connects with hole 39a in needle valve seat bushing 39. Thus, when the valve members 34 and 35 are in alignment as shown in Figs. 2, 3, and 5, with the needle valve 48a open, air is permitted to flow thru valve bushing 39, valve opening 39a, groove 35b of valve member 35 to and thru hole 34c and hose bushing 34b of valve member 34. When valve member 35 is rotated 90° in a counter-clockwise direction as shown in Fig. 6, no passage of air to hole 34c as described above is permitted, even though needle valve 48a is open, since groove 35b of valve 35 no longer is opposite hole 34c of valve member 34. In this latter position groove 35b connects with a hole 34d in member 34 and vented to atmosphere for reasons later explained.

To better understand the combined control functions, the electrical wiring diagram, Fig. 8, will now be discussed briefly. Reference numeral 52 indicates the conventional vehicle battery, the positive side of which is connected to ground by conductor 53. The negative lead from coil 46a of the control actuator illustrated in Fig. 2 is connected to the negative side of battery 52 thru conductor 54, diode 55, conductor 56, brake stop light switch 57 and conductor 58. The positive lead from coil 46a is connected to ground thru conductor 59, switch contacts 42, and conductor 60. Conductor 56 also connects brake light 64 to the negative side of battery 52, and conductor 65 connects brake light 64 to ground in the usual manner. Conductor 54 also connects the negative lead of coil 46a to the negative side of battery 52 thru switch 61, conductor 62, ignition switch 63 and conductor 58.

In order to describe the operation of the throttle control mechanism thus far mentioned of Figs. 1 through 8 inclusive, it will be understood that vacuum actuator 25 is connected by a suitable flexible hose or tubing 66 to valve bushing 39 of control selector 32 and that bushing 34b of selector 32 is also connected through a similar hose 67 and 68 to the conventional vacuum system normally used to operate for example a windshield wiper vacuum motor 69 whereby vacuum actuator 25 would likewise be activated if needle valve 48a Fig. 2 were opened.

Assume now that the operator is driving at a nominal speed of 35 m.p.h. and that he desires to maintain this speed without the necessity of manually depressing and holding pressure upon the foot operated gas feeding pedal 22. This is accomplished by turning knob 38 of control selector 32, which may be located in a convenient and easily accessible position near the driver's seat, in a clockwise direction against the tension of spring 36 until limit pin 34a Figs. 2 and 5 arrests and holds valve member 35 in the position shown in Figs. 2, 3, and 7. In this position, torsion spring 36 exerts not only counter-clockwise torque to valve 35, but also causes the same to be pressed against stationary valve member 34, thus sealing both valve member surfaces tightly against each other. This also keeps the air gap between frame 32a and armature 37 open as long as coil 46a remains de-energized.

As previously described, both valve members 34 and 35 oppose each other, permitting air to flow through the respective passages 34c and 35b when needle valve 48a is opened. Doing so causes air behind vacuum actuator 25, to be substantially evacuated, allowing atmospheric pressure to act upon diaphragm 31 which through link 30 rotates lever 28 in a clockwise direction thus advancing adjustable bracket 27 and throttle linkage 15 in the direction as indicated by the arrow, Fig. 1 since advancing the throttle linkage feeds more gas into engine 11, the vehicle remains at what ever speed needle valve 48a is adjusted to, this being accomplished by turning knob 49 in a counter-clockwise direction until the desired speed, i.e. 35 m.p.h. is obtained. Once this speed has been pre-set by knob 49, subsequent adjustment is not needed, assuming the vehicle is operated on level roads and that the pre-set speed is desired each time the control knob 38 is set for automatic operation, as explained above.

Should the operator desire to increase the driving speed momentarily to pass another car, he merely depresses the foot pedal 22 to further open the throttle valve 14 in a normal manner. As the throttle linkage, in particular rod 15, advances, arm 27 attached thereto moves away from lever 28, since the latter only pushes against arm 27 during automatic throttle operation and when no pressure is applied against foot pedal 22. Therefore, if after passing the operator removes pressure from foot pedal 22, arm 27 will arrest the throttle linkage against lever 28, keeping valve 14 partially open allowing the engine to operate at the previously predetermined speed of 35 m.p.h. assumed for the above example.

As previously mentioned, application of the vehicle brakes automatically releases the throttle mechanism instantly permitting the throttle linkage to return to the idle position through action of spring 16a. This is accomplished by closing the brake light switch 57, which also energizes magnet coil 46a of control selector 32 in the following manner. By again referring to wiring diagram of Fig. 8 this circuit can be traced from ground to the positive side of battery 52 through conductor 53, from the negative side of battery 52 through conductor 58, switch 57 (closed by brake pedal) through conductor 56, through coil 46a, conductor 59, switch 42 and through conductor 60 to ground. It should be noted here that switch contacts 42 are closed by control selector 32, in particular by cam 35a of control valve member 35, as shown in Fig. 2. Switch leaf 41 of control selector 32 is connected to conductor 59, whereas leaf 40 is grounded through pressure plate 44 to frame 32a. Conductor 56, Fig. 8, is also connected to brake light 64, and the positive side of brake light 64 is connected to ground through conductor 65.

When the brake mechanism, not shown, is operated and switch 57 is thereby closed, control selector coil 46a energizes simultaneously with brake light 64. This causes armature 37 of control selector 32 to close its air gap between frame 32a and core 33 allows valve disc member 35 to clear limit pin 34a sufficiently to permit spring 36 to rotate armature 37, knobs 38 and 49 counter-clockwise until valve member 35 and switch cam lobe 35a assume an "off" position as shown in Fig. 6. Referring to Fig. 2, it will be seen that lateral motion of valve member 35 also causes switch contacts 42 to open the circuit to coil 46a as the angular surface 40a of switch leaf 40 slides off the matching cam surface on lobe 35a. Thus, armature 37 can freely rotate as explained above under influence of spring 36, since practically no friction exists between members 34, 35 at the time the air gap is closed with pin 34a riding down the incline of slot 35e. As the armature continues to rotate toward closed position, the radial cam surface of lobe 35a permits switch contacts 42 to stay open, even though spring 36 urges valve member 35 and armature 37 in the open air gap direction, as shown in Fig. 2. In this position valve member 35 closes the air passage from needle valve 39a, groove 35b to hole 34c, and opens the air passage to atmosphere through vent 34c, rendering vacuum actuator 25, Fig. 1 inoperative, permitting spring 16a to return the throttle linkage rapidly to the idle position as previously explained.

Referring again to the wiring diagram, Fig. 8, switch 61 represents a "kick-down" switch operated by gas feeding pedal 22 and serves the purpose of releasing the automatic throttle control mechanism when pedal 22 is fully depressed. When the manually actuated foot switch 61 is momentarily closed, another electric circuit to coil 46a of control selector 32 is completed, but without causing brake light 64 to light. This circuit may be traced from ground to positive side of battery 52 through conductor 53, and from ground through conductor 60, control actuator switch contacts 42, conductor 59, coil 46a, conductor 54, switch 61, conductor 62, ignition switch 63, and conductor 58 to the negative side of battery 52. Blocking diode 55 prevents brake light 64 from lighting when switch 61 is closed since sufficient current cannot flow from conductor 56 to conductor 54, the resistance of diode 55 in that direction being too high.

Atttention is now directed to another feature optionally usable with this invention, the structure of which is illustrated in Figs. 9, 10, and 11, the mode of application being illustrated in Fig. 12. The purpose of this additional feature of the invention is to automatically hold any pre-set speed within certain limits and to automatically compensate for varying road conditions by advancing or releasing the throttle linkage through vacuum actuator 25 which, in this instance, is preferably provided with a non-vented plug 25b. This feature comprises an air transfer or metering device, hereinafter also called "governor," which is operated directly from the speedometer cable. The governor, its application, principle and logic will now be described in further detail.

Referring to Fig. 9, the conventional speedometer shaft 71, coupling 72 and sleeve nut 73 is shown coupled to governor casing 75 by means of a threaded adapter extension 75a formed thereon for this purpose. Extension 75a centrally supports bearing sleeve 76 which accommodates adapter shaft 77, the latter being provided with a retainer groove into which is recessed thrust washer 77b behind a retainer 77a. Shaft 77 is also provided with a square hole thru its longitudinal axis which accommodates the square end 71a of speedometer cable 71 at one end and adapter shaft 78 at the opposite end, the latter of which serves the purpose of driving the speedometer 74. The governor casing comprises the cylindrical frame or casing members 75, 82 threaded together to form an enclosure for a rotor 79. Adapter shaft 78 and shaft 77 are held together by pin 78 which is loosely confined by the cylindrical axis of rotor body 79, the latter being integrally supported by shaft 77 as shown in Figs. 9 and 10. Rotor body 79 is held against the inner surface 75b of frame 75 by compression spring 80 tensioned against rotor cover 81 and retainer 80a in shaft 78 which being integral with shaft 77, is held in place by retainer 77b. The extension 82a of casing 82 is provided with an internal thread 82b and serves as means for mounting the governor upon the speedometer 74 as shown also in Fig. 12.

Referring to Fig. 9, attention is now directed to airhose connector tubes 75c and 75d, both of which are recessed into frame casing 75 at opposite sides 180° apart. Tube 75c runs through hole 75g to atmosphere and tube 75d connects through hose 75h with vacuum hose 66. Frame 75 is also provided with angular air ducts 75e and 75f leading from tubes 75c and 75d partially through frame 75 and terminating on the inner surface 75b. Rotor 79, Fig. 10, as seen through line 10—10 of Fig. 9 is provided with three elongated holes 79a, 79b, and 79c displaced at 120° from one another, permitting one hole at any one time to either pass vent duct 75e or 75f in frame 75 as rotor 79 rotates with shaft 77. Since rotor cover 81, Figs. 9 and 11, is held tightly against outer wall 79d and inner core of rotor body 79 by spring 80 as previously explained, and rotor 79 is in contact against surface 75b of frame 75, an air-tight chamber 81a exists at such time as when none of the vent holes 79a, 79b or 79c are opposite air ducts 75e or 75f. Therefore, it follows that air entering through tube 75c and duct 75e, can enter chamber 81a only at the moment one of the three holes 79a, 79b, or 79c are in line with duct 75e, thus filling chamber 81a by atmospheric pressure. Only after a given partial rotation of rotor 79 is the air in chamber 81a allowed to escape through duct 75f and tube 75d, this being determined by a variable time delay depending on the rotational speed of rotor 79, causing the successive vent hole, for example hole 79b, Fig. 10, to line up with duct 75f in frame 75. The area of holes 79a, 79b and 79c is of sufficient ratio to the cubic area of chamber 81a as to cause the chamber to fill to substantially the same extent each time a hole is exposed to duct 75e regardless of rotor speed within a practical speed range. It will therefore be apparent that no matter what the rotational speed, within practical limits, may be, substantially the same volume of air is always transferred per cycle. Thus, the slower rotor 79 is driven by speedometer cable 71, shaft 77 and extension 78, the fewer number of times can a substantially equal amount of air be transferred from the intake tube 75c to outlet tube 75d and vice versa.

Therefore, as the governor described above transfers air more frequently at an increased speed, the under-pressure or vacuum behind diaphragm 31, Fig. 1, would diminish, resulting in lever 28 moving in a counter-clockwise direction thereby releasing the throttle linkage, allowing butterfly valve 14 to feed less gas to engine 10. This will reduce the motor and vehicle speed accordingly, which also reduces the speed of rotor 79.

If the r.p.m.'s of engine 10 and the speed of the vehicle drops below that pre-set by needle valve 48a, Fig. 2, the speed of rotor 79 will drop proportionally also, thus transferring air, as previously explained, less frequently, which results in a greater under-pressure or vacuum behind diaphragm 31, Fig. 1. This causes diaphragm 31 to actuate arm 28 in a clockwise direction, thereby advancing the throttle linkage until a balance exists keeping the vehicle at a constant speed automatically. It can be seen therefore, that once the throttle control selector 32, Figs. 2 through 7 inclusive, is turned on for automatic operation and speed control knob 49 is adjusted to a pre-set speed as indicated by pointer 51 on a miles per hour scale not shown, the vehicle will accelerate from idle position to the predetermined speed, since vacuum actuator 25, Figs. 1 and 12, advances the throttle linkage under control of the speed governor, as explained above, until the vehicle speed exceeds that set by dial 49 for needle valve 48a. As explained above, slight excess speed will reduce the under-pressure which tends to actuate diaphragm 31 of vacuum actuator 25, Figs. 1 and 12, allowing spring 16a to urge the throttle linkage toward idling position, keeping the vehicle speed constant, within certain limits, thus, automatically compensating for varying road conditions. It may be pointed out that utilization of the above described invention, especially on long trips, results in considerable fuel savings, since during automatic operation butterfly valve 14 is gradually and evenly opened and/or closed, which generally is difficult to achieve when the vehicle is manually controlled in the usual manner.

It is of course understood that the miles per hour scale for the knob or dial 49 is calibrated preferably in accordance with vehicle speed in the normal driving or an axle ratio between the motor and the vehicle and that reference or implication herein to the effect that motor speed is an indication of vehicle speed relates to conditions within any one driving ratio. However, it will be noted that the control knob may be employed in place of foot accelerator 22 to accelerate and decelerate to a selected speed regardless of varying drive ratios, assuming shifting is effected either automatically or manually at the proper vehicle speed, since in accelerating the pressure on the vacuum side of the actuator will always be less than that required at the selected speed until the selected increased speed is reached and in decelerating will always be greater than that required at the selected speed until the selected reduced speed is reached.

While I have shown and described a preferred embodiment of my invention, it will be apparent to those skilled in the art that numerous modifications and variations may be made in the form and construction thereof, without departing from the fundamental principles of the invention. I therefore desire, by the following claims, to include within the scope of my invention all such similar and modified forms of the apparatus disclosed, by which the results of the invention may be obtained by substantially the same or equivalent means.

It will, of course, be understood that, although the above description refers to a specific direction of air flow resulting from the specified connections to atmosphere and vacuum supply, respectively, the same results would be achieved from reversing air flow direction by, for example, substituting atmosphere for the vacuum supply and vice versa. Likewise, since the system requires only that air be supplied at two different pressures; a compressed air supply, if available, could be utilized rather than a vacuum supply, whereby the system would operate as a result of the pressure differential between the compressed air and atmosphere.

What is claimed is:

1. Speed control apparatus for a motor having a speed regulating member comprising, an actuator responsive to differential in pressure from separate fluid pressure sources and operatively connected to adjust said regulating member in accordance with variable amounts of said differential in pressure, and a selector control device including a valve member manually settable to directly vary the amount of pressure on said actuator from one of said sources, said control device including electromagnetic means effective when operated for disconnecting said actuator from said one pressure source, whereby a preselected pressure differential will be maintained on said actuator to effect a corresponding adjustment of said regulating member until said electromagnetic means become operative.

2. Speed control apparatus for a motor having a speed regulating member and linkage manually operated for adjusting said member comprising, an actuator responsive to differential in pressure from separate fluid pressure sources and operatively engaging said linkage to adjust said member in accordance with variable amounts of pressure differential, and a selector control device including a valve member manually settable to directly vary the amount of pressure on said actuator from one of said sources, said device including electromagnetic means effective when operated for disconnecting said actuator from said one pressure source, whereby a selected adjustment for said regulating member will be effected through said linkage in accordance with a selected pressure differential on said actuator as long as said electromagnetic means remain inoperative.

3. A speed control apparatus for a motor having a speed regulating member comprising, an actuator responsive to differential in pressure from separate fluid pressure sources and operatively connected to adjust said regulating member in accordance with variable amounts of said differential in pressure, selector means including a valve member manually adjustable within a gradated range of operative settings to directly vary and regulate the amount of pressure on said actuator from one of said sources, and governor means comprising a fluted transfer rotor mechanism driven in synchronism with said motor for varying the amount of pressure on said actuator from said one pressure source to compensate for variations in motor speed resulting from varying load factors placed on said motor, whereby said speed regulating member is automatically adjusted through the balance existing between the pressure differential on said actuator and the speed of said governing means to maintain a substantially uniform motor speed regardless of varying load factors placed on said motor.

4. Speed control apparatus for a motor having a speed regulating member and linkage manually operable for effecting the adjustment of said regulating member comprising, an actuator responsive to differential in pressure from separate fluid pressure sources and operatively engaging said linkage to adjust said member in accordance with variable amounts of said differential in pressure, selector means including a valve member manually adjustable within a gradated range of operative settings to directly vary and regulate the amount of pressure on said actuator from one of said sources, and governor means comprising a fluid transfer rotor mechanism driven in synchronism with said motor for varying the amount of pressure on said actuator from said one pressure source to compensate for variations in motor speed resulting from varying load factors placed on said motor, whereby said speed regulating member may be adjusted by said linkage through a balance existing between the pressure differential on said actuator and the speed of said governing means to maintain a substantially uniform motor speed regardless of various load factors placed on said motor.

5. Speed control apparatus for a motor operable under a variety of load factors and having a speed regulating member comprising, an actuator responsive to differential in pressure from separate fluid pressure sources and operatively connected to adjust said regulating member in accordance with variable amounts of said differential in pressure, a selector control device including a valve member manually adjustable within a gradated range of operative settings to directly vary and regulate the amount of pressure on said actuator from one of said pressure sources, said control device including electromagnetic means effective when operated for disconnecting said actuator from said one pressure source, and governor means comprising a fluid transfer rotor mechanism driven in synchronism with said motor for varying the amount of pressure on said actuator from said one pressure source to compensate for variations in motor speed resulting from varying load factors placed on said motor, said governing means causing the pressure differential on said actuator to balance against motor speed, whereby said speed regulating member is adjusted by said actuator to maintain a substantially uniform motor speed regardless of load factors placed on said motor as long as said electromagnetic means remain inoperative.

6. Speed control apparatus for a motor operable under various load factors and having a speed regulating member with linkage manually operated for adjusting said member comprising, an actuator responsive to differential in pressure from separate fluid pressure sources and operatively engaging asid linkage to adjust said member in accordance with variable amounts of pressure differential, a selector control device including a valve member manually adjustable with a gradated range of operative settings to directly vary and regulate the amount of pressure on said actuator from one of said sources, said device including electromagnetic means effective for disconnecting said actuator from said one pressure source, and governing means comprising a fluid transfer rotor mechanism driven in synchronism with said motor for varying the amount of pressure on said actuator from said one pressure source to compensate for variations in motor speed resulting from variations in load factors placed on said motor, said governing means causing the pressure differential on said actuator to balance against motor speed, whereby said linkage is automatically operated to adjust said speed regulating member for maintaining substantially uniform speed regardless of load factors placed on said motor until said electromagnetic means are rendered effective.

7. In speed control apparatus of the character described having actuating means operable in accordance with differential in pressure from separate pressure sources, a selector control mechanism for connecting one of said pressure sources to said actuating means comprising, a magnetic core, a valve member integral with said core and vented to said one pressure source, a manually settable armature mounted for rotatable and linear movement relative to said core, a valve member integral with said armature and vented to said actuating means, said valve members complementing each other to define a conduit between said one source and said actuating means when in the open rotated position and to define a barrier between said one source and said actuating means when in the closed rotated position, yieldable means acting linearly and rotatably on said armature to urge said armature into open gap relation to said core and to urge the latter said valve member to the closed rotated position, and detent means effective in the open gap position of said armature for retaining the latter said valve member in the open rotated position.

8. The invention according to claim 7 wherein said detent means includes a detent indenture formed in one of said valve members and a detent projection formed on the other valve member, said projection engaging in said indenture under the influence of said yieldable means when said members are in the open rotated position.

9. The invention according to claim 8 including an inclined cam surface formed in the valve member having said indenture, said surface communicating with said indenture and being disposed for bearing engagement with said projection, the incline of said surface being in a direction to decrease the frictional resistance to the relative rotation between said members from the open to closed position.

10. In speed control apparatus of the character described having actuating means operable in accordance with the differential in pressure from separate pressure sources, a selector control mechanism for connecting one source of pressure to said actuating means and comprising, a magnetic core, a valve member integral with said core and vented to said one pressure source, a manually settable armature mounted for rotatable and linear movement relative to said core, a valve member integral with said armature and rotatable with said armature between an open and closed position, said rotatable valve member being vented to said actuating means and cooperating with said first mentioned valve member to define a conduit between said one pressure source and said actuating means when in the open position and to define a barrier between said one pressure source and said actuating means when in the closed position, yieldable means acting linearly and rotatably on said armature, the linear action of said last mentioned means urging said armature to open gap relation with said core to achieve relative cooperation between said valve members, the rotatable action of said yieldable means urging said rotatable valve member to closed position, detent means effective in the open gap position of said armature for retaining said rotatable valve member in the open position, switching means for connecting the winding of said magnetic core to a current source, and camming means formed on said rotatable valve member for operating said switching means.

11. The invention according to claim 10 wherein said camming means are formed to provide dual camming surfaces, one of said surfaces being effective for operating said switching means in accordance with the rotatable movement of the said rotatable valve member, the other camming surface being effective for operating said switching means in accordance with linear travel of said rotatable valve member.

12. In speed control apparatus of the character described having actuating means operable in accordance with differential in pressure from separate pressure sources, a selector control mechanism for connecting one of said pressure sources to said actuating means comprising, a magnetic core, a manually settable armature mounted for rotatable and linear movement relative to said core, a first valve means including a valve member integral with said core and a complementary valve member integral with said armature, said valve means being connected with said one pressure source and said actuating means to define a conduit between said one pressure source and said actuating means when in the open position and to define a barrier between said one source and said actuating means when in the closed position, a second valve means mounted in said armature and manually adjustable to selectively restrict the area of said conduit defined by said first valve means, yieldable means acting linearly and rotatably on said armature, the linear action of said last mentioned means urging said armature into open gap relation with said core, the rotatable action of said yieldable means urging the rotatable member of said first valve means towards the closed position, and detent means effective when said armature is in open gap relation to said core for retaining said first valve means in open condition.

13. In speed control apparatus of the character described having actuating means operable in accordance with differential in pressure from separate pressure sources, a selector control mechanism for connecting one pressure source to said actuating means comprising, a magnetic core, a manually settable armature mounted for rotatable and linear movement relative to said core, a first valve means including a stationary valve member integral with said core and a rotatable valve member integral with said armature, said valve means defining a conduit between said one pressure source and said actuating means when in the open rotated position and defining a barrier between said one pressure source and said actuating means when in the closed rotated position, a second valve means mounted on said armature and manually adjustable to selectively restrict the conduit defined by said first valve means, yieldable means acting linearly and rotatably on said armature, the linear action of said last mentioned means urging said armature into open gap relation to said core, the rotatable action of said yieldable means urging said rotatable valve member into closed position, switching means for connecting the winding of said magnetic core to a current source, cam means formed on said rotatable valve member for operating said switching means in response to rotatable and linear travel of said rotatable valve member, and detent means effective when said armature is in open gap relation to said core for retaining said rotatable valve member of said first valve means in open position.

14. In motor speed control apparatus of the character described having actuator means operable in accordance with differential in pressure between separate fluid pressure sources operating on said actuator means, governor control means for varying the pressure on said actuator means from one of said separate sources in accordance with variations in motor speed comprising, a rotor casing having separate ports communicating with said separate pressure sources and terminating on a common interior surface of said casing, and a rotor driven in synchronism with the said motor and formed to define with said casing a sealed chamber between said separate ports, said rotor being vented to expose said chamber to said ports alternately during rotation of said rotor, whereby a transfer conduit is provided between said separate pressure sources of a magnitude varying directly wtih the rotated speed of said rotor to cause the pressure differential on said actuator means to vary inversely to the rotated speed of said rotor.

15. In motor speed control apparatus of the character described having actuating means operable in accordance with differential in pressure between separatae fluid pressure sources operating on said actuator means, governor control means for varying the pressure on said actuator means from one of said sources in accordance with variations in motor speed and comprising, a rotor casing having separate ports connecting with said separate pressure sources, each said port terminating on a common interior surface of said casing, a rotor disposed within said casing and formed to define with said common interior surface a sealed chamber between said separate ports, said rotor being provided with a plurality of vents arranged arcuately to align with said ports and being spaced apart to expose said chamber to said ports alternately and singly during rotation of said rotor, and means for driving said rotor in synchronism with said motor whereby a transfer conduit is provided between said separate pressure sources of a magnitude varying directly with the rotated speed of said rotor to cause the pressure differential on said actuating means to vary inversely to the rotated speed of said rotor.

References Cited in the file of this patent

UNITED STATES PATENTS

| | | |
|---|---|---|
| 2,021,832 | Callihan | Nov. 19, 1935 |
| 2,111,284 | Girl | Mar. 15, 1938 |
| 2,556,485 | Robnett | June 12, 1951 |
| 2,671,542 | Robnett | Mar. 9, 1954 |
| 2,695,629 | Ribley | Nov. 30, 1954 |
| 2,755,877 | Kelem | July 24, 1956 |
| 2,776,722 | Germanich | Jan. 8, 1957 |
| 2,809,708 | Edwards | Oct. 15, 1957 |
| 2,867,196 | Francis | Jan. 6, 1959 |

UNITED STATES PATENT OFFICE
CERTIFICATE OF CORRECTION

Patent No. 2,948,271                                          August 9, 1960

Vladimir Ignatjev

It is hereby certified that error appears in the printed specification of the above numbered patent requiring correction and that the said Letters Patent should read as corrected below.

Column 8, line 71, for "fluted" read -- fluid --; column 12, line 17, for "wtih" read -- with --.

Signed and sealed this 11th day of April 1961.

(SEAL)
Attest:
ERNEST W. SWIDER                                ARTHUR W. CROCKER
Attesting Officer                                      Acting Commissioner of Patents